(12) United States Patent
Tyler et al.

(10) Patent No.: US 8,945,763 B2
(45) Date of Patent: Feb. 3, 2015

(54) SYSTEMS AND METHODS FOR MANUFACTURING BATTERY CELLS

(71) Applicant: Johnson Controls Technology Company, Holland, MI (US)

(72) Inventors: Matthew R. Tyler, Brown Deer, WI (US); Jason D. Fuhr, Sussex, WI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/746,054

(22) Filed: Jan. 21, 2013

(65) Prior Publication Data

US 2013/0196197 A1 Aug. 1, 2013

Related U.S. Application Data

(60) Provisional application No. 61/593,222, filed on Jan. 31, 2012, provisional application No. 61/697,539, filed on Sep. 6, 2012.

(51) Int. Cl.
*H01M 2/08* (2006.01)
*H01M 2/02* (2006.01)

(52) U.S. Cl.
USPC ........... 429/183; 429/178; 429/180; 429/181; 429/182

(58) Field of Classification Search
None
See application file for complete search history.

(56) References Cited

U.S. PATENT DOCUMENTS

| | | | |
|---|---|---|---|
| 3,578,506 A * | 5/1971 | Chassoux | 429/183 |
| 6,155,889 A * | 12/2000 | Scarla et al. | 439/774 |
| 8,263,246 B2 | 9/2012 | Fuhr et al. | |
| 2006/0051664 A1 | 3/2006 | Tasai et al. | |
| 2006/0068277 A1* | 3/2006 | Kim et al. | 429/161 |
| 2007/0026307 A1 | 2/2007 | Kim | |
| 2009/0208836 A1 | 8/2009 | Fuhr et al. | |
| 2010/0216001 A1 | 8/2010 | Byun et al. | |
| 2011/0129712 A1 | 6/2011 | Fuhr et al. | |
| 2011/0135975 A1 | 6/2011 | Fuhr et al. | |
| 2011/0200858 A1 | 8/2011 | Fuhr et al. | |
| 2012/0003513 A1 | 1/2012 | Fuhr | |
| 2012/0003522 A1 | 1/2012 | Fuhr et al. | |
| 2012/0015235 A1 | 1/2012 | Fuhr et al. | |
| 2012/0077062 A1 | 3/2012 | Fuhr et al. | |
| 2012/0125447 A1 | 5/2012 | Fuhr et al. | |
| 2012/0148889 A1 | 6/2012 | Fuhr et al. | |
| 2012/0263988 A1 | 10/2012 | Obasih et al. | |
| 2012/0301756 A1 | 11/2012 | Fuhr et al. | |
| 2012/0328922 A1 | 12/2012 | Bonhomme et al. | |

FOREIGN PATENT DOCUMENTS

| | | |
|---|---|---|
| EP | 2324530 A2 | 5/2011 |
| EP | 2338187 A2 | 6/2011 |
| EP | 2489094 A2 | 8/2012 |

OTHER PUBLICATIONS

International Search Report for application No. PCT/US5146/022562 mailed Apr. 4, 2013.

* cited by examiner

*Primary Examiner* — Cynthia K. Walls
(74) *Attorney, Agent, or Firm* — Fletcher Yoder, P.C.

(57) ABSTRACT

A system includes a battery cell having a packaging and a coil disposed within the packaging. The battery cell further includes a first terminal electrically coupled to a portion the coil and protruding through an opening in the packaging, wherein the first terminal is hermetically sealed at the opening in the packaging using a compressive force.

22 Claims, 11 Drawing Sheets

US 8,945,763 B2

SYSTEMS AND METHODS FOR MANUFACTURING BATTERY CELLS

CROSS REFERENCE TO RELATED APPLICATIONS

This application claims priority from and the benefit of U.S. Provisional Application Ser. No. 61/593,222, entitled "PRISMATIC HEV CELL DESIGN," filed Jan. 31, 2012, and claims priority from and the benefit of U.S. Provisional Application Ser. No. 61/697,539, entitled "RADIAL CELL TERMINAL SEAL-SHRINK/PRESS FIT RING DESIGN," filed Sep. 6, 2012, which are both hereby incorporated by reference in their entirety for all purposes.

BACKGROUND

The present disclosure relates generally to the field of batteries and battery modules. More specifically, the present disclosure relates to battery cells that may be used in vehicular contexts (e.g., xEVs), as well as other energy storage/expending applications.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles" (xEVs)) may provide a number of advantages compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case of certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. Additionally, it may also desirable to improve the performance of such batteries and to reduce the cost associated with the battery systems. For example, for an xEV battery system, it may be desirable for a battery system to be suitably packaged to properly function in a wide range of environmental conditions (e.g., heat, cold, moisture, vibrations, and so forth) that the battery system may encounter during operation.

SUMMARY

In an embodiment, a system includes a battery cell having a packaging and a coil disposed within the packaging. The battery cell further includes a first terminal electrically coupled to a portion the coil and protruding through an opening in the packaging, wherein the first terminal is hermetically sealed at the opening in the packaging using a compressive force.

In another embodiment, a battery cell package includes a first cupped portion disposed about a first terminal port on a face of the package. The first terminal port is configured to allow the first terminal to pass through the package configured to be compressed by a first press-fit ring toward the first terminal to seal the first terminal port.

In another embodiment, a method of manufacturing a battery cell includes providing a battery package having a terminal port and an open face. The method further includes providing a coil assembly, wherein the coil assembly includes a coil coupled to a terminal. The method includes passing the terminal through the terminal port from inside the battery package and hermetically sealing the terminal port using a compressive force.

DRAWINGS

DETAILED DESCRIPTION

Figure 1:
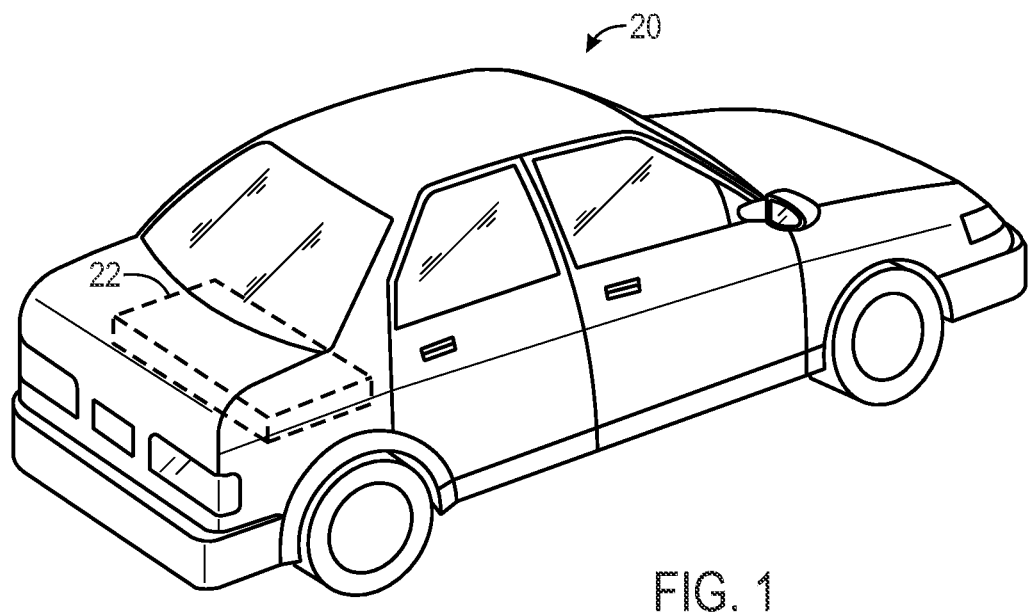
FIG. 1 is a perspective view of an embodiment of a vehicle, an xEV, having a battery module contributing all or a portion of the motive power for the vehicle, in accordance with an embodiment of the present approach.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned, battery systems may be used to provide power to a number of different types of vehicles operating in a number of different types of environments. These battery systems may include a number of battery modules, each battery module having a number of battery cells (e.g., electrochemical cells). Further, each battery cell may generally include a packaging (e.g., a metal or polymer package) to sequester the internal components (e.g., coils, electrolytes, collectors, etc.) of the battery system from the external environment. Additionally, the packaging of each battery cell may be sealed (e.g., hermetically sealed) in a particular manner, for example, to prevent environmental moisture from entering the battery cell or to prevent electrolyte from spilling out of the battery cell.

Accordingly, presently disclosed are a number of systems and methods for the manufacture of battery cells. In particular, in accordance with the present approach, a coil assembly may first be manufactured and may be introduced into an open face of a packaging. As set forth in detail below, the packaging may be manufactured from a number of different materials (e.g., metals or plastics) and may have a number of different shapes (e.g., prismatic, cylindrical, oblong cylindrical, and so forth). Additionally, as set forth in detail below, the packaging may include a number of features (e.g., vents, terminal ports having cups or lips, shelves or ledges, a base plate that may be attached using welding or crimping, and so forth) and may enable either a positive, negative, or neutral polarity in different embodiments. The packaging may generally include at least one opening (e.g., terminal port) to allow at least one terminal (e.g., coupled to the coil assembly) to traverse the packaging and extend or protrude to the outside of the packaging. Further, as set forth in detail below, present battery cell embodiments generally seal at least one terminal port using a compressive force (e.g., a bolt terminal seal or a press-fit ring seal, discussed below), as opposed to welding at or near the terminal. As discussed below, the presently disclosed systems and methods enable efficient manufacturing of battery cells, reducing manufacturing time and cost.

With the foregoing in mind, FIG. 1 is a perspective view of an xEV vehicle 20 in the form of an automobile (e.g., a car) having a battery system 22 for providing all or a portion of the motive power for the vehicle 20. Such a xEV vehicle 10 may be an electric vehicle (EV), a hybrid electric vehicle (HEV), a plug-in hybrid electric vehicle (PHEV), or other type of vehicle using electric power for at least a portion of the propulsion power. Further, although the vehicle 20 is illustrated as a car in FIG. 1, the type of vehicle may differ in other embodiments, all of which are intended to fall within the scope of the present disclosure. For example, the vehicle 20 may be a truck, bus, industrial vehicle, motorcycle, recreational vehicle, boat, or any other type of vehicle that may benefit from the use of electric power for all or a portion of its propulsion power. Additionally, while the battery system 22 is illustrated in FIG. 1 as being positioned in the trunk or rear of the vehicle, according to other embodiments, the location of the battery system 22 may differ. For example, the position of the battery system 22 may be selected based on the available space within a vehicle, the desired weight balance of the vehicle, the location of other components used with the battery system 22 (e.g., battery management systems, vents or cooling devices, etc.), and a variety of other considerations.

Figure 2:
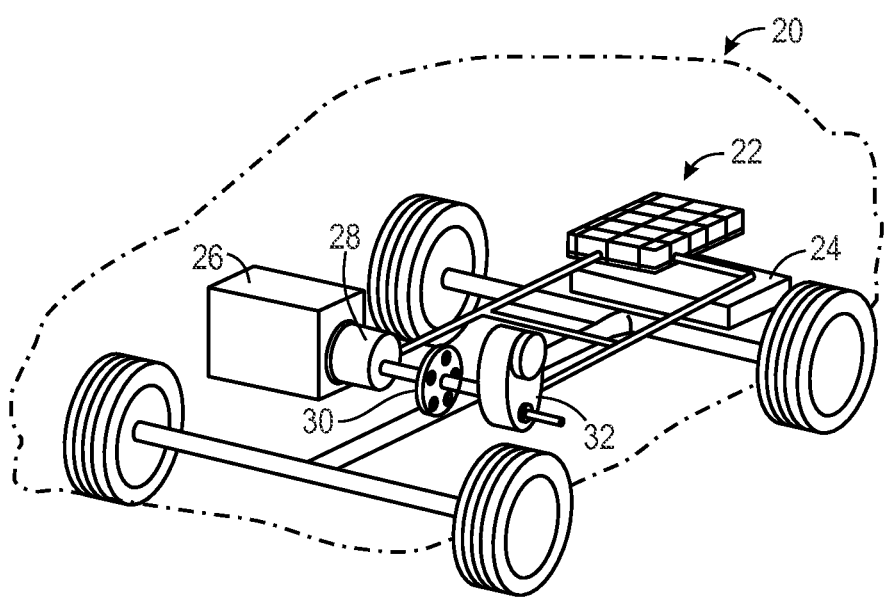
FIG. 2 illustrates a cutaway schematic view of an embodiment of the vehicle of FIG. 1 provided in the form of a hybrid electric vehicle, in accordance with an embodiment of the present approach.

FIG. 2 illustrates a cutaway schematic view of a vehicle 20 provided in the form of an xEV (e.g., a HEV) having a battery system 22, in accordance with an embodiment of the present approach. In particular, the battery system 22 illustrated in FIG. 2 is disposed toward the rear of the vehicle 20 proximate a fuel tank 24. In other embodiments, the battery system 22 may be provided immediately adjacent the fuel tank 24, provided in a separate compartment in the rear of the vehicle 20 (e.g., a trunk), or may provided in another suitable location in the vehicle 20. Further, as illustrated in FIG. 2, an internal combustion engine 26 may be provided for times when the vehicle 20 utilizes gasoline power to propel the vehicle 20. The vehicle 20 also includes an electric motor 28, a power split device 30, and a generator 32 as part of the drive system.

The xEV vehicle 20 illustrated in FIG. 2 may be powered or driven by the battery system 22 alone, by the engine 26 alone, or by both the battery system 22 and the engine 26. It should be noted that, in other embodiments of the present approach, other types of vehicles and configurations for the vehicle drive system may be utilized, and that the schematic illustration of FIG. 2 should not be considered to limit the scope of the subject matter described in the present application. According to various embodiments, the size, shape, and location of the battery system 22, the type of vehicle 20, the type of xEV vehicle technology (e.g., EV, HEV, PHEV, etc.), and the battery chemistry, among other features, may differ from those shown or described.

The battery system 22 generally includes a plurality of battery cells (e.g., electrochemical cells), discussed in greater detail below. The battery system 22 may also include features or components for connecting the electrochemical cells to each other and/or to other components of the vehicle electrical system, and also for regulating the electrochemical cells and other features of the battery system 22. For example, the battery system 22 may include features that are responsible for monitoring and controlling the electrical performance of the battery system 22, managing the thermal behavior of the battery system 22, containment and/or routing of effluent (e.g., gases that may be vented from an electrochemical cell through a vent), and other aspects of the battery system 22.

Figure 3:
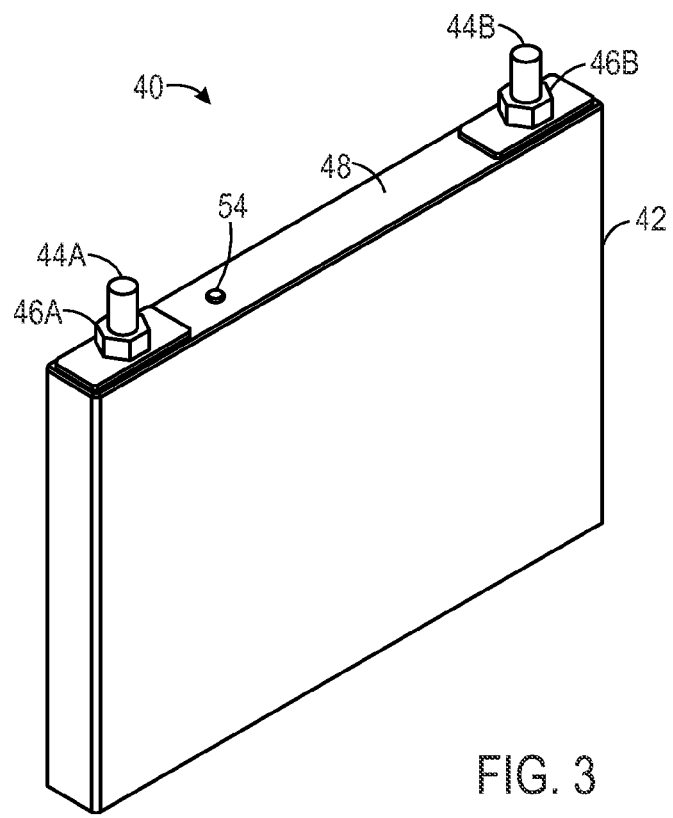
FIG. 3 is a perspective view of a prismatic battery cell, in accordance with an embodiment of the present approach.

With the foregoing in mind, FIG. 3 is a perspective view of a battery cell 40, in accordance with an embodiment of the present approach. For example, in certain embodiments, the battery cell 40 may be one of a plurality of battery cells in the battery system 22 illustrated in FIGS. 1 and 2. The battery cell 40 illustrated in FIG. 3 includes a packaging 42 that may be metallic (e.g., made from steel, aluminum, or another suitable metal) or may be polymeric (e.g., acrylonitrile butadiene styrene (ABS), a polystyrene (PS), a polyimide (PI), or another suitable polymer or plastic or combination thereof). Further, the packaging 42 of the battery cell 40 generally has the shape of a rectangular prism. As discussed below, in other embodiments, the packaging 42 of the battery cell 40 may have a different shape (e.g., cylindrical, oblong cylindrical, or a different prismatic shape) according to the energy density and size constraints for the battery cell 40 and or the battery system 22. However, it should be appreciated that, for many embodiments, the packaging 42 may be provided having a single open face (e.g., the bottom face of the battery cell 40, not shown) for insertion of a coil assembly, as discussed in detail below.

As illustrated in FIG. 3, the battery cell 40 includes a positive terminal 44A and a negative terminal 44B extending through a top face 48 of the battery cell 40. Additionally, the positive and negative terminals 44A and 44B illustrated in FIG. 3 are bolts (stud fasteners), wherein the head of the bolt is disposed within the packaging (not shown) and the threaded shafts of the bolts protrude through the top face 48 of the battery cell 40. In certain embodiments, the bolt terminals 44A and 44B may be made of aluminum, stainless steel, nickel, copper, or tin, depending on the desired physical properties (e.g., yield strength, electrical resistivity, chemical compatibility, and so forth). Further, each of the terminals 44A and 44B respectively include a nut (e.g., nuts 46A and 46B). As discussed in greater detail below, the nuts 46A and 46B generally provide a compressive force between the nuts 46A and 46B and the heads of the bolts of the positive and negative terminals 44A and 44B, respectively, to hermetically seal the battery cell 40 at the positive and negative terminals 44A and 44B. Also, the illustrated top face 48 of the battery cell 40 includes a rivet 54 that may be used to seal a small opening in the top face 48 after introducing electrolyte into the battery cell 40, as set forth in detail below. It may be appreciated that the rivet 54 represents only one method of sealing this orifice in the top face 48, and that other types of sealing (e.g., compressive seals, adhesive seals, or other suitable methods of sealing) are also presently contemplated. It should further be appreciated that, the use of the bolts as terminals 44A and 44B may generally provide a reliable hermetic seal, but may somewhat increase the level of resistance in the battery cell 40. For example, the bolt terminals 44A and 44B may generally increase contact resistance between the bolt terminals 44A and 44B and the attached collectors 68A and 68B, respectively, as well as increase resistance due to threaded fasteners. Accordingly, in certain embodiments, utilizing the press-fit seal discussed below, may obviate these concerns while still providing a reliable hermetic seal using a compressive force.

Figure 4:
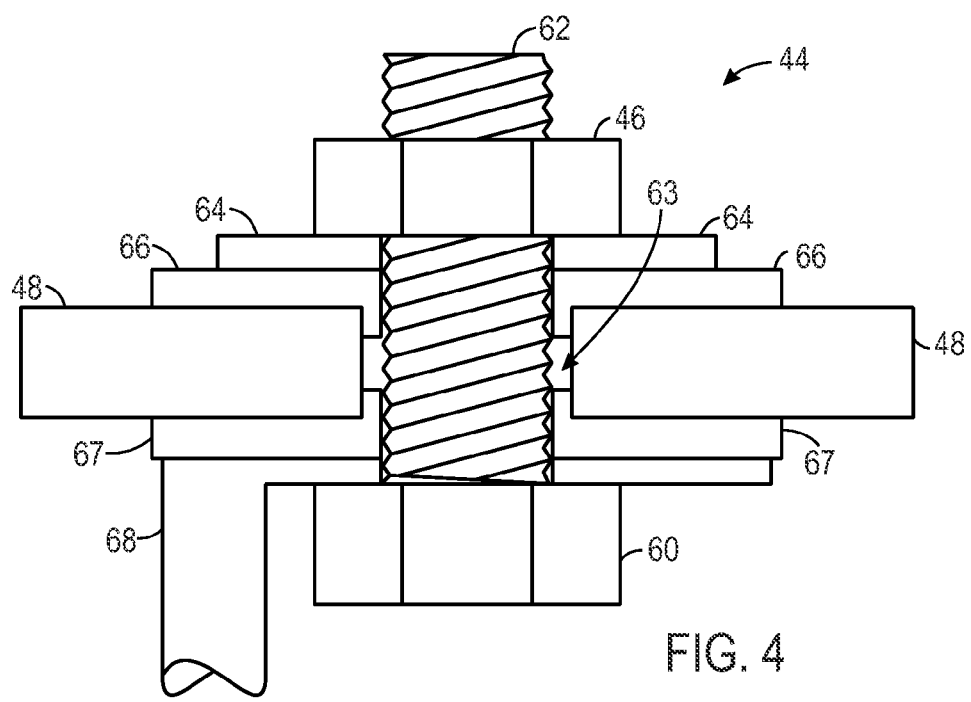
FIG. 4 is a cross-sectional view of a bolt terminal seal, in accordance with an embodiment of the present approach.

FIG. 4 is a cross-sectional view of an embodiment of a sealed bolt terminal 44 (e.g., terminal 44A or 44B) of the battery cell 40 illustrated in FIG. 3. As set forth above, the bolt terminal 44 illustrated in FIG. 4 includes a head 60 that is disposed on the inside of the packaging 40 and includes a threaded shaft 62 protruding through the packaging 40 through the opening 63 (e.g., terminal port 63) in the top face 48. More specifically, the top face 48 of the packaging 40 is disposed between the head 60 of the bolt terminal 44 and the nut 46 (e.g., nuts 46A or 46B illustrated in FIG. 3), such that there is a compressive force applied between the head 60 of the bolt terminal 44 and the nut 50. Additionally, the illustrated embodiment includes a washer 64 disposed beneath the nut 50 to enable adequate tightening of the nut 50 and adequate distribution of the compressive force provided by the bolt terminal 44 and nut 50 combination. Similarly, on the inside of the packaging 40, the head of the bolt terminal 44 may be secured or coupled to the top of a collector 68 (e.g., a positive or negative collector of the coil assembly, discussed below). The top of the collector 68 may, like the washer 64, allow adequate tightening of the bolt terminal 44 and/or more evenly distribute the compressive force provided by the bolt terminal 44 and nut 50 combination. Further, the illustrated embodiment includes a gasket 66 disposed inside the packaging between the top of the collector 68 and the top face 48 of the packaging 40. Additionally, the illustrated embodiment includes another gasket 67 disposed between the washer 64 and the top face 48 of the packaging 40 outside the packaging. It should be appreciated that, accordingly, in certain embodiments, the bolt terminals 44A and 44B, the washers 64A and 64B, the gaskets 66A and 66B, the collectors 68A and 68B, and the nuts 46A and 46B may generally cooperate to hermetically seal the terminals 44A and 44B via a compressive force.

Accordingly, the battery cell 40 illustrated in FIG. 3, having terminals 44A and 44B as illustrated in FIG. 4, is provided as one example of a battery cell that utilizes a compressive force to hermetically seal at least one of the terminals. Other examples of compression-based sealing of the terminals are discussed below. In general, it should be appreciated that compressive force sealing of the terminals, as presently disclosed, provides a number of advantages during the manufacture of the battery cell (e.g., battery cell 40). Further, in certain embodiments, the present approach enables the installation of a coil assembly into the packaging 42, the compressive sealing of the terminals 44 and 46, and the closing of the bottom of the packaging (e.g., via a crimping process) without performing a welding operation, which may increase battery cell production rates and reduce battery cell costs.

Figure 5:
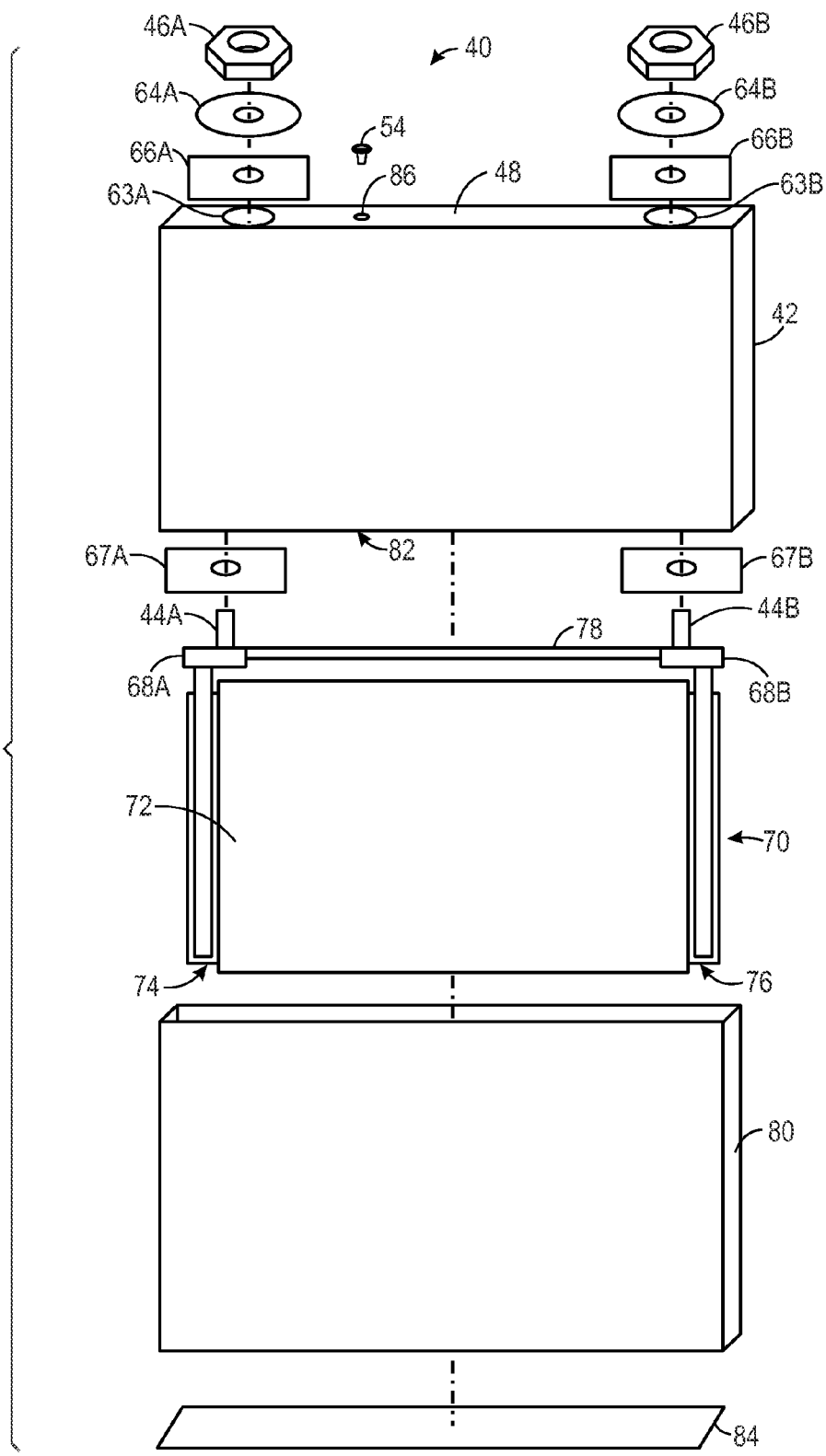
FIG. 5 is an exploded view of the prismatic battery cell embodiment of FIG. 3.

To better illustrate the internal components and the manufacture of the battery cell 40, FIG. 5 provides an exploded view of the battery cell 40 illustrated in FIG. 3. In certain embodiments, the assembly of the battery cell 40 may begin with manufacturing the coil assembly 70. The coil assembly 70 generally includes a layered coil structure 72 that provides the electrochemical components (e.g., the cathode and anode) of the battery. In other embodiments, rather than a coil, the layered structure 72 may be formed from a number of stacked plates. While generally beyond the scope of the present disclosure, the multi-layered coil structure 72 of the illustrated battery cell 40 may be assembled, for example, from multiple layers of long, thin, flat materials simultaneously wound into a coil having a cylindrical or oblong cylindrical shape. For example, the illustrated multi-layered coil structure 72 may generally include a negative coil layer (e.g., a copper anode layer), a first insulating layer, a positive coil layer (e.g., an aluminum cathode layer), and a second insulating layer. In certain embodiments, the first or second insulating layer may be polyethylene (PE) or another suitable dielectric material. It may be appreciated that positioning a layer of insulating material between each layer of negative coil layer and positive coil layer generally prevents contact between the coil materials, resultantly preventing short circuits within the layered coil structure 72. It should also be appreciated that the layered coil structure 72 may also include other components, such as binders (e.g., carboxymethyl cellulose (CMC)), surface area enhancers (e.g., graphite), and the like.

Further, as illustrated in FIG. 5, the coil assembly 70 includes a positive collector 68A that has been welded to a portion 74 of the positive coil layer (e.g., an aluminum cathode layer) that extends from the side of the layered coil structure 72. Similarly, the coil assembly 70 includes a negative collector 68B that has been welded to a portion 76 of the negative coil layer (e.g., a copper anode layer) that extends from the opposite side of the layered coil structure 72. For example, the portions 74 and 76 of the positive and negative coil layers may be respectively compressed or folded and welded into a slot or channel in the collectors 68A and 68B in order to electrically couple the collectors 68A and 68B with the cathode and anode of the layered coil structure 72, respectively. Further, as illustrated, the collectors 68A and 68B may electrically and physically couple to the terminals 44A and 44B, respectively. For example, in certain embodiments, the bolt terminal 44 may seat within a portion of the collectors 68 such that the head 60 of the bolt terminal 44 is secured by within collector 68. Additionally, the coil assembly 70 illustrated in FIG. 5 includes an assembly bridge 78 that physically (but not electrically) couples the terminals 44A and 44B to one another. It should be appreciated that, in certain embodiments, the assembly bridge may be made from a non-conductive material, while in other embodiments, the assembly bridge 78 may be coupled to the collectors (e.g., 68A and 68B) via a non-conductive piece (e.g., a stud gasket). However, in other embodiments of the battery cell 40, the assembly bridge 78 may not be included.

Accordingly, once the coil assembly 72 illustrated in FIG. 5 has been assembled, the coil assembly 72 may be disposed within an insulating film 80 that may electrically isolate the coil assembly 72 from the packaging 42 once assembled. For example, in certain embodiments, the insulating film 80 may be wrapped around the outside of the coil assembly 72 before being introduced into the packaging 42. In certain embodiments, the insulating film 80 may be a polyimide film, a polysulfonate film, a polypropylene film, or another suitable dielectric film. It should be appreciated that the terminals 44A and 44B may extend out of the dielectric film 80 for insertion into the terminal ports 63A and 63B, respectively, in subsequent steps. Further, in certain embodiments, the insulating film 80 may be affixed using adhesives or heat staked (e.g., using ultrasonic stakes) along the sides and/or edges of the coil assembly 182. It should be appreciated that, in certain embodiments, non-continuous attachment of the insulating film 80 (e.g., non-continuous ultrasonic staking) may allow for electrolyte to more easily flow into the coil assembly 182 once the battery cell 160 has been assembled.

Once disposed within the insulating film 80, bottom gaskets 67A and 67B may be placed over the terminals 44A and 44B of the coil assembly 70 or, alternatively, within the interior of the packaging 42 over the terminal ports 67A and 67B, respectively. In certain embodiments, the bottom gaskets 67A and 67B may respectively hold (e.g., maintain the position) the heads 60 of the bolt terminals 44A and 44B (illustrated in FIG. 4) in addition to, or in alternative to, the top of the collectors 68A and 68B. Once the bottom gaskets 67A and 67B are in place, the coil assembly 70 may be inserted into the open bottom 82 of the packaging 42 such that the terminals 44A and 44B protrude or extend up through the terminal ports 63A and 63B disposed on the top face 48 of the packaging 42. After the coil assembly 70 is disposed within the packaging 42, top gaskets 66A and 66B may be disposed around the terminals 44A and 44B, followed by the washers 64A and 64B, and followed by the nuts 46A and 46B, respectively. Furthermore, the nuts 46A and 46B may be tightened onto the terminals 44A and 44B such that a compressive force is applied, resulting in a hermetic seal.

Once the terminal ports 63A and 63B of the battery cell 40 illustrated in FIG. 5 have been hermetically sealed using a compressive force, as presently disclosed, the packaging may be closed and the battery cell 40 may be filled with an electrolyte. For example, the packaging 42 may be inverted such that the open bottom face 82 of the packaging 42 is directed upward. Once inverted, in certain embodiments, the packaging 42 may be filled with an electrolyte through the open bottom face 82 before the base plate 84 is attached to the packaging 42. In other embodiments, the base plate 84 may be attached to the packaging 42 and, subsequently, the packaging 42 may be inverted such that the top face 48 is directed upward once more. For such embodiments, the battery cell 40 may be filled with electrolyte through a small opening 86 in the top face 48 of the packaging 42 and, subsequently, the small opening 86 may be filled with the rivet 54 to seal the top face 48 of the battery cell 40. However, as set forth above, other methods of sealing the opening 86 are also contemplated. It may be appreciated that, in certain embodiments, the battery cell 40 may be place under a vacuum prior to introducing the electrolyte to the interior of the battery cell 40 to speed filling.

It should be appreciated that, in certain embodiments, the battery cell 40 illustrated in FIG. 5 may have a packaging 42 having a substantially neutral polarity; however, in other embodiments other variations are possible. It should further be appreciated that, while the battery cell 40 illustrated in FIG. 5 is loaded with the coil assembly 70 from the open bottom face 82 of the packaging 42, as set forth above, in other embodiments, other variations are possible. To illustrate examples of such variations, FIGS. 6-9 provide alternative embodiments to the battery cell 40 of FIG. 5, including embodiments having positive or negative polarity packaging and embodiments in which the coil assembly may be loaded from a side face of the packaging (e.g., side-loading). It should be noted that FIGS. 6-9 illustrate specific components of alternative embodiments (e.g., the packaging and coil assembly); however, other components illustrated in FIG. 5 (e.g., gaskets 66 and 67, washers 64, nuts 46, insulating film 80, etc.) may also be suitable incorporated into the embodiments of FIGS. 6-9 to form the alternative battery cell embodiments. It may also be noted that each of the battery cell embodiments presently disclosed may include at least one terminal that is sealed using a compressive force (e.g., using a bolt terminal seal, as set forth above, or a press-fit seal, as set forth below).

Figure 6:
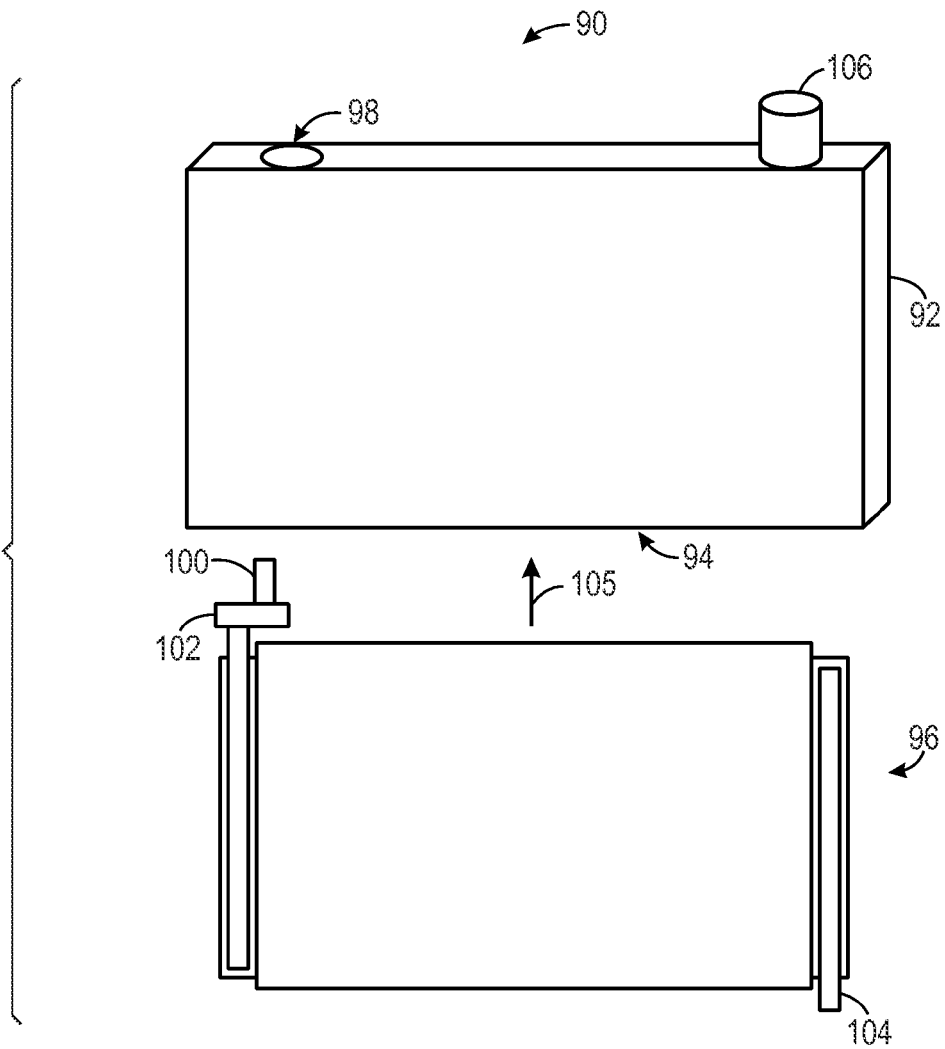
FIG. 6 is a partially exploded view of an alternative embodiment of the prismatic battery cell of FIG. 3 that includes a packaging having a positive or negative polarity.

With the foregoing in mind, FIG. 6 illustrates portions of an alternative battery cell 90 having a positive polarity packaging 92. Like the packaging 42 illustrated in FIG. 5, the packaging 92 is a metallic packaging generally includes an open bottom face 94 that allows for insertion of a coil assembly 96 during assembly of the battery cell 90. Further, the packaging 92 includes an opening 98 (e.g., terminal port 98) to allow the negative terminal 100, which is coupled to the negative collector 102 of the coil assembly 96, to pass through the packaging 92. Like the battery cell 40 of FIG. 5, the negative terminal 100 of the battery cell 90 illustrated in FIG. 6 may be hermetically sealed within the opening 98 using a compressive force (e.g., using a bolt terminal seal, as set forth above, or a press-fit seal, as set forth below). However, unlike the battery cell 40, the positive collector 104 instead extends below the coil assembly 96 such that it may be coupled (e.g., welded or otherwise suitably attached) to the packaging 92 after loading 105 the coil assembly 96 into the packaging 92. Accordingly, while the anode of the battery cell 90 may be electrically isolated from the metallic packaging 92, the cathode of may be electrically coupled to provide a packaging 92 having a positive polarity. As such, there is a positive terminal 106 that may be formed into or affixed to the packaging 92 prior to the loading of the coil assembly 96. It may be appreciated that, in certain embodiments, the terminal 106 may also be formed be sealed using a compressive force (e.g., using a bolt terminal seal, as set forth above, or a press-fit seal, as set forth below). Further, in certain embodiments, the polarities of the battery cell 90 may be reversed such that the packaging has a negative polarity.

Figure 7:
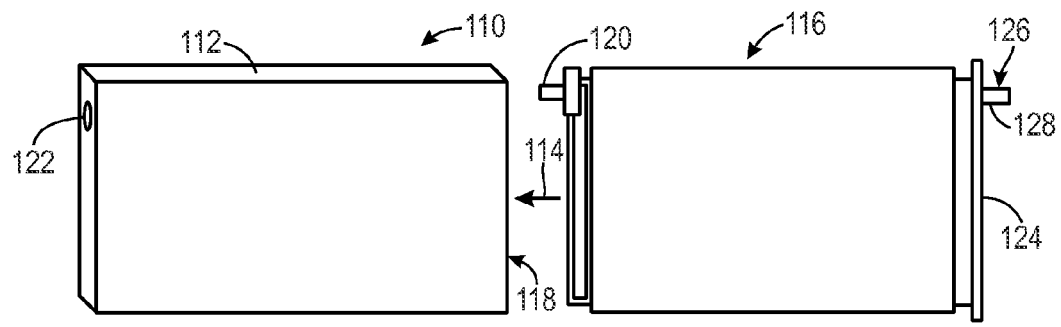
FIG. 7 is a partially exploded view of another alternative embodiment of the prismatic battery cell of FIG. 3 that is side-loaded and includes a packaging having a neutral polarity.

Like the battery cell 40 of FIG. 5, the battery cell 110 illustrated in FIG. 7 includes a packaging 112 having a neutral polarity. However, in contrast to the battery cell 40, the battery cell 110 allows for side-loading 114 of the coil assembly 116 via the open face 118. It may generally be appreciated that the side-loading embodiments (e.g., of FIGS. 7-9) may generally allow for greater energy density (e.g., approximately 7% greater energy density) since a great portion the terminal may be disposed outside of the packaging allowing the coil to occupy a greater portion of the internal volume of the packaging once assembled. For example, in certain embodiments, during assembly of the battery cell 110, the coil assembly 116 may be side-loaded 114 and the positive terminal 120 may be sealed about the opening 122 (e.g., terminal port 122) using a compressive force (e.g., using a bolt terminal seal, as set forth above or a press-fit seal, as set forth below). Further, the illustrated coil assembly 116 includes a side plate 124 that is welded to the coil assembly 116 and has an opening 126 through which the negative terminal 128 extends. In other embodiments, the side plate 124 may be coupled to the coil assembly 116 compressive force (e.g., using a bolt terminal seal, as set forth above, or a press-fit seal, as set forth below). Once attached to the coil assembly 116, the side plate 124 may be attached (e.g., welded, crimped, or otherwise suitably attached) to the packaging 112. In certain embodiments, the side plate 124 may first be attached to the packaging 112 and then, subsequently, the terminal port 126 may be sealed using a compressive force as described.

Figure 8:
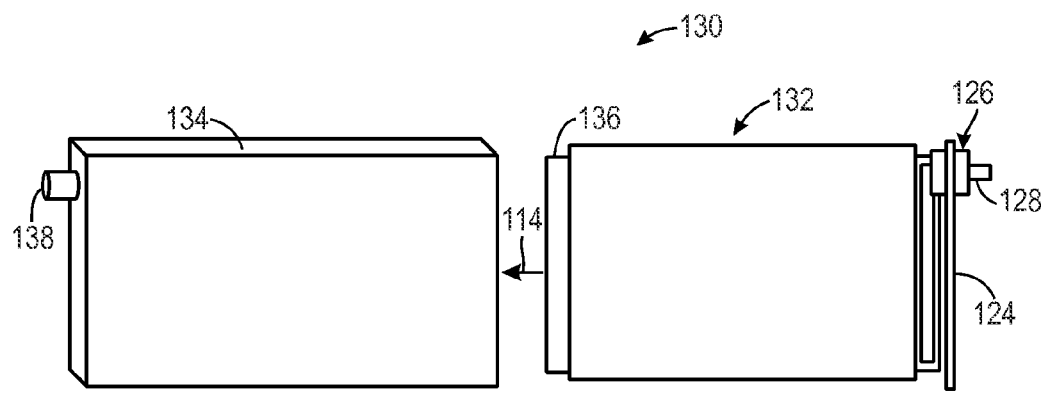
FIG. 8 is a partially exploded view of another alternative embodiment of the prismatic battery cell of FIG. 3 that is side-loaded and includes a packaging having a positive or negative polarity.

Like the battery cell 110 illustrated in FIG. 7, the battery cell 130 illustrated in FIG. 8 allows for side-loading 114 of the coil assembly 132 into the packaging 134. In contrast to the battery cell 110, the battery cell 130 illustrated in FIG. 8 includes a packaging 134 having a positive polarity. That is, the coil assembly 132 of the battery cell 130 may include a portion 136 (e.g., a portion of the cathode coil extending from within the coil assembly 132 or a positive collector coupled to the cathode portion of the coil assembly 132) that may contact or be coupled to the packaging 134 upon insertion of the coil assembly 132 into the packaging 134. Accordingly, the packaging 134 of the battery cell 130 may include a terminal 138 that may be formed into or coupled to the packaging 134 prior to the loading 114 of the coil assembly 132. Further, the battery cell 130 includes a side plate 124 having an opening 126 through which the negative terminal 128 extends. In certain embodiments, the side plate 124 may be coupled to the coil assembly 132 via welding or using a compressive force (e.g., using a bolt terminal seal, as illustrated, or a press-fit seal, as set forth below) before the side plate 124 is attached (e.g., welded, crimped, or otherwise suitably attached) to the packaging 134. In other embodiments, the side plate 124 may first be attached to the packaging 134 and then, subsequently, the terminal port 126 may be sealed using a compressive force as described.

Figure 9:
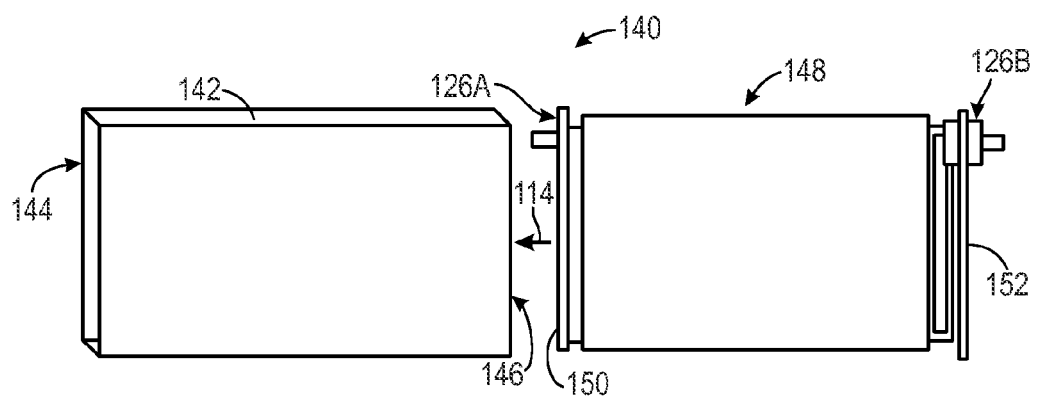
FIG. 9 is a partially exploded view of another alternative embodiment of the prismatic battery cell of FIG. 3 that includes two open faces and includes a package having a neutral polarity.

The embodiment of the battery cell 140 illustrated in FIG. 9 is unique in that the packaging 142 includes two open side faces 144 and 146. Accordingly, the packaging 142 also allows for side-loading 114 of the coil assembly 148. Further, the coil assembly 148 includes side plates 150 and 152 that are coupled to the remainder of the coil assembly 148 via welding or a compressive force seal (e.g., using a bolt terminal seal, as set forth above, or a press-fit seal, as set forth below). In certain embodiments, the side plates 150 and 152 may be coupled to the coil assembly 148 and then welded or sealed using a compressive force (e.g., using a bolt terminal seal, as set forth above, or a press-fit seal, as set forth below) before the side plates 150 and 152 are attached (e.g., welded, crimped, or otherwise suitably attached) to the packaging 142. In other embodiments, one or more of the side plates 150 and 152 may first be attached to the packaging 142 and then, subsequently, the terminal ports 126A and/or 126B may be sealed using a compressive force as described.

Figure 10:
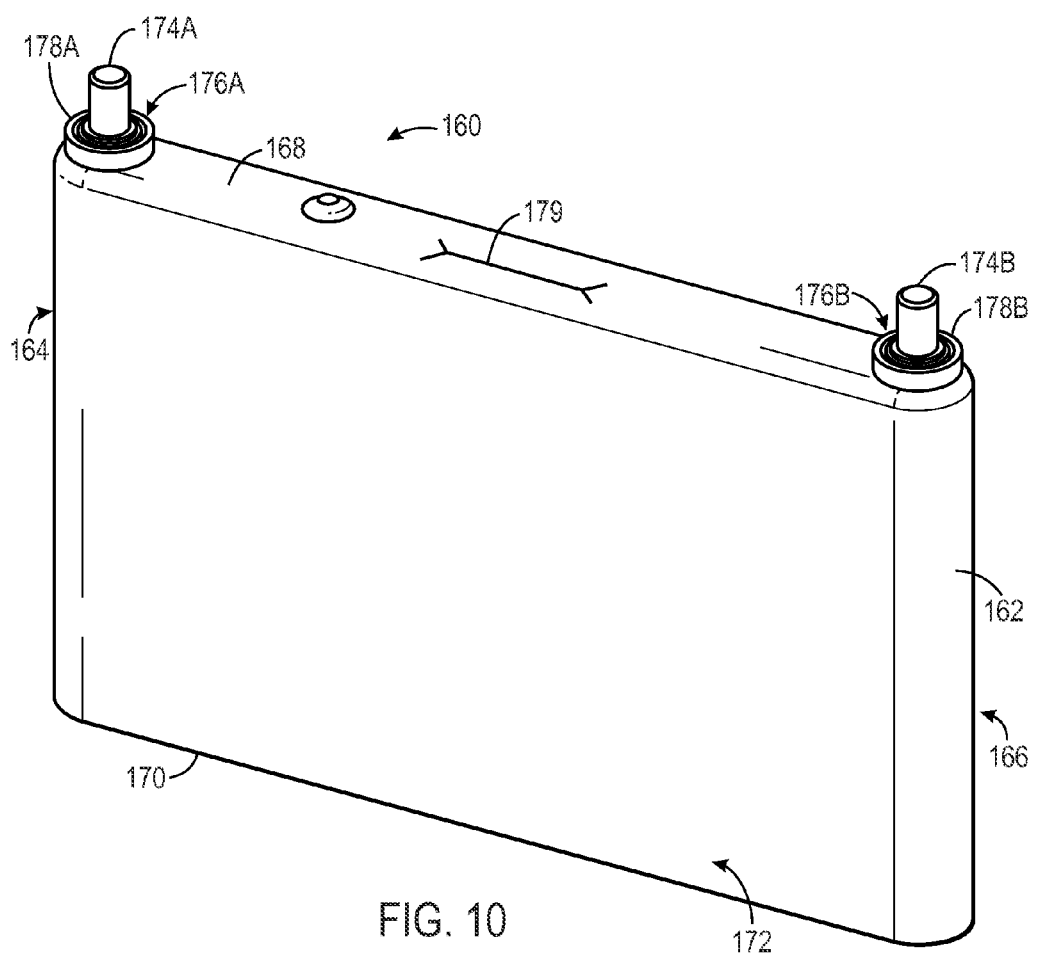
FIG. 10 is a perspective view of a battery cell having an oblong cylindrical shape, in accordance with an embodiment of the present approach.

FIG. 10 illustrates a perspective view of another embodiment of a battery cell 160 having an oblong cylindrical shape. That is, the packaging 162 of the battery cell 160 generally has two rounded (e.g., semi-circular) ends 164 and 166 as well as four generally flat faces: a top face 168, a bottom face 170, a front face 172, and back face (not shown). Further, the rounded ends 164 and 166 include the positive and negative terminals 174A and 174B hermetically sealed within the openings 176A and 176B (e.g., terminal ports 176A and 176B) in the top face 168 of the packaging 162, respectively. That is, as set forth in detail below, the positive and negative terminals 174A and 174B are sealed within the openings 176A and 176B via a compressive force supplied by press-fit rings 178A and 178B respectively disposed over the terminals. Further, the packaging 162 includes a vent feature 179 (e.g., a stamped vent feature) that may allow the packaging 162 to vent in circumstances in which the pressure within the packaging exceeds a threshold due to excessive gas evolution. It should be appreciated that, in other embodiments, the terminals 174A and 174B may be disposed further from the rounded ends 164 and 166 and closer to the center of the top face 168 of the battery cell 160.

Figure 11:
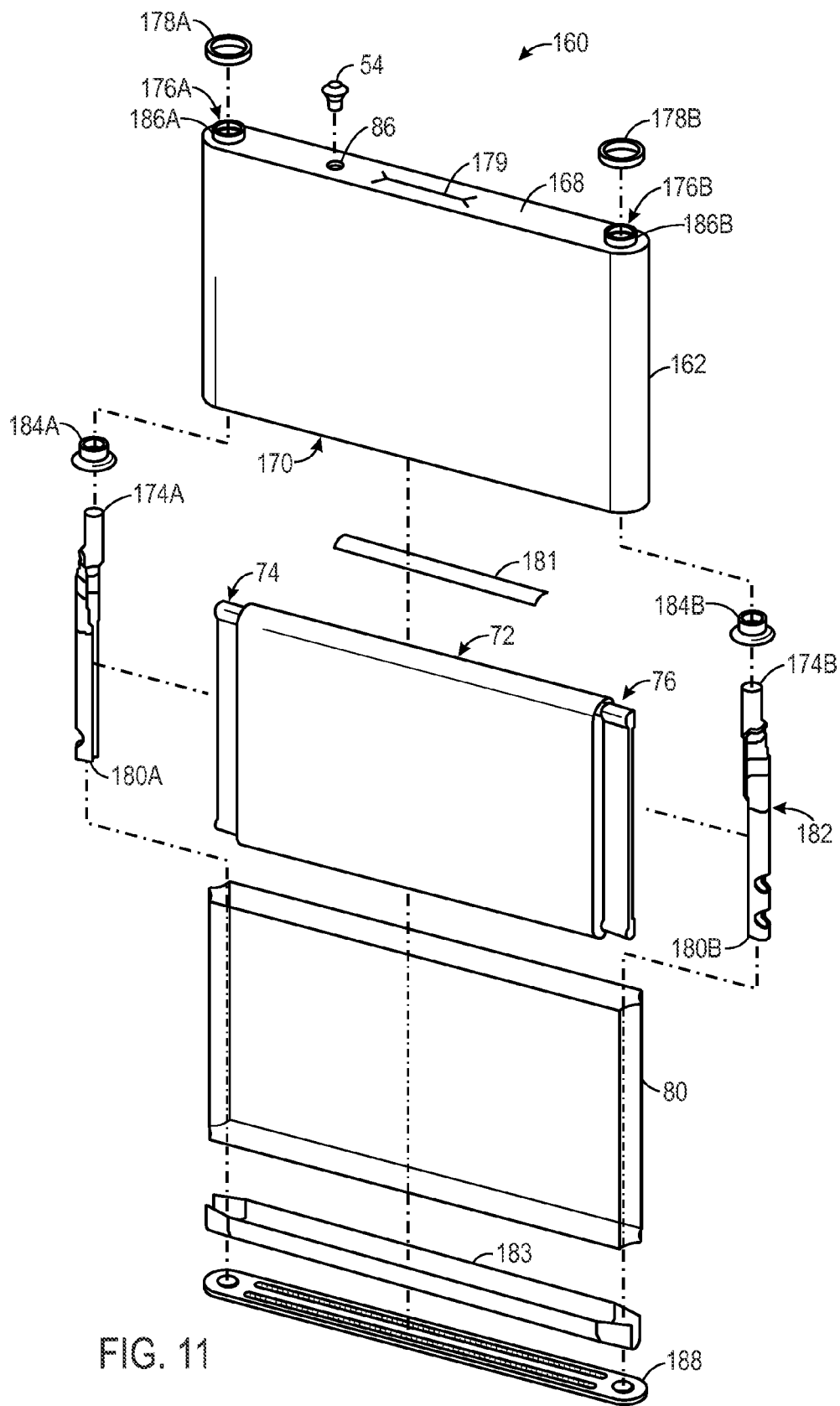
FIG. 11 is an exploded view of the battery cell embodiment of FIG. 10.

To better illustrate the internal components and the manufacture of the battery cell 160, FIG. 11 includes an exploded view of the battery cell 160. Like the battery cell 40 discussed above, the battery cell 160 includes a coil 72 having a number of anode layers and cathode layers generally separated by insulating layers. From the sides of the coil 72 a portion of the cathode layers 74 and a portion of the anode layers 76 extend out for attachment (e.g., laser welding, alter sonic welding, resistance welding, or another suitable method of attachment) to the positive and negative collectors 180A and 180B. It should be appreciated that, the illustrated collectors 180A and 180B are consolidated into a single piece with the terminals 174A and 174B, respectively, which may generally lower the internal resistance of the battery cell 160 relative to other designs. However, in other embodiments, the collectors 180A and 180B may include two or more pieces coupled together. Further, in certain embodiments, the portion of the cathode layers 74 and the portion of the anode layer 76 that respectively extend from the sides of the coil 72 may be respectively attached to the collectors 180A and 180B on at least two sides (e.g., disposing these extended portions with into a V-shaped collector plate and welding the portions to both sides of the V-shaped collector plate) to provide a robust electrical and mechanical connection to the coil 72.

Once the positive and negative collectors 180A and 180B have been attached to the coil, the resulting coil assembly 182 may be disposed within an insulating film 80 as described above. Additionally, in certain embodiments, a layer 181 (e.g., a double-sided tape or a single lane of adhesive) may be disposed on top of the coil 72 after the coil assembly 182 is disposed within the insulating film 80. Further, in certain embodiments, an additional layer 183 (e.g., a polyimide film or another suitable material) may be positioned between the insulating film 80 and the base plate 188.

Next, as illustrated in FIG. 11, on top of the terminals 174A and 174B, insulating gaskets 184A and 184B (discussed in greater detail below) may be disposed. Once the insulating gaskets 184A and 184B have been respectively disposed on the terminals 174A and 174B, in certain embodiments, the coil assembly 182 may be inserted into an open bottom face 170 of the packaging 162 such that the terminals 174A and 174B may respectively extend through the openings 176A and 176B of the top face 168 of the packaging 162, and then press-fit rings 178A and 178B may be respectively disposed around the cupped portions 186A and 186B disposed around the openings 176A and 176B and compressed to form a hermetic seal using a compressive force, as set forth in detail below. In other embodiments, the press-fit rings 178A and 178B may first be respectively disposed around the cups portion 186A and 186B, and subsequently the coil assembly 182 may be inserted into the open bottom face 170 of the packaging 162 and the terminals 174A and 174B pulled up through the openings 176A and 176B, respectively. For such embodiments, the terminals 174A and 174B may be respectively inserted with sufficient force through the openings 176A and 176B such that the press-fit rings 178A and 178B form a hermetic seal using a compressive force, described in greater detail below.

Once the terminals 174A and 174B have been sealed within the openings 176A and 176B, respectively, the packaging 162 of the battery cell 160 may be filled with electrolyte and the base plate 188 may be coupled to the packaging 162 to serve as the bottom face 170. In certain embodiments, the base plate 188 may be flat or have a boat-like or trough-like shape. Further, it should be appreciated that, in certain embodiments, the base plate 188 may include one or more features, such as features (e.g., tabs, hooks, brackets, ledges, etc.) to allow the battery cell 160 to be attached to the battery module 22, features (e.g., fins, channels, ports, etc.) to allow thermal management of the battery cell 162, and so forth. As discussed above with respect to the battery cell 40 of FIG. 5, in certain embodiments, the battery cell 160 may be inverted and filled with electrolyte prior to attaching (e.g., welding, crimping, or otherwise suitably attaching) the base plate 188, while in other embodiments, the base plate 188 may first be attached and the electrolyte may be introduced from the opening 86 in the top face 168 of the packaging 162 before the opening 86 is sealed by the rivet 54. However, as set forth above, in other embodiments, rather than using the rivet 54, other methods of sealing (e.g., compression sealing, adhesive sealing, or another suitable method of sealing) may be utilized.

Figure 12:
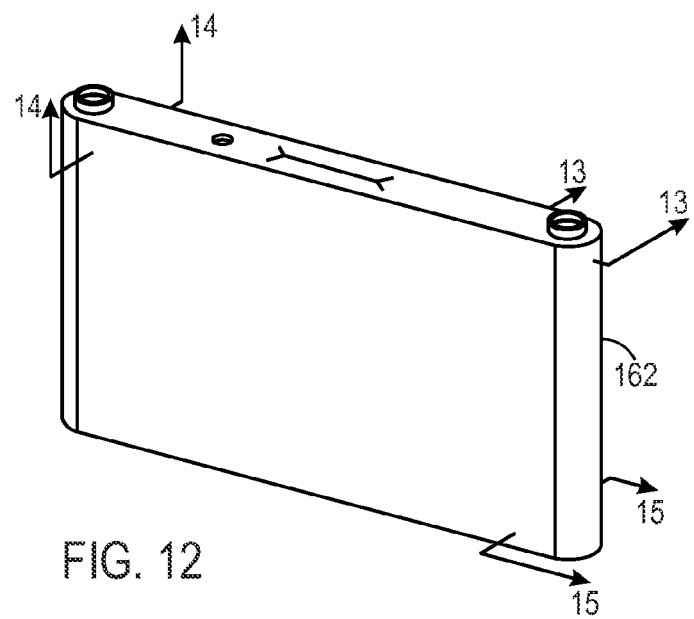
FIG. 12 is a perspective view of the packaging of the battery cell embodiment of FIG. 10.

To better illustrate features of the packaging 162 of the battery cell 160 illustrated in FIGS. 10 and 11, FIGS. 13-15 illustrate cross-sectional views of the packaging 162 as illustrated in FIG. 12. In certain embodiments, the packaging 162 may be metallic (e.g., made from steel, aluminum, or another suitable metal) or may be polymeric (e.g., made from a plastic or suitable polymer). Accordingly, for certain embodiments having a metallic packaging 162, the packaging 162 may have a neutral polarity, as illustrated by the battery cell 162 in FIG. 10. In other embodiments of the battery cell 160 having a metallic packaging, the packaging 162 may have a positive or negative polarity. For example, alternative embodiments of the battery cell 160 may be manufactured similar to the battery cell 90 of FIG. 6, but including the features of the packaging 162 (e.g., including enabling the use of the press-fit seal to seal the terminal).

Figure 13:
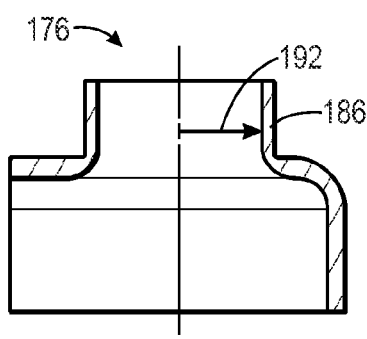
FIG. 13 is a cross-sectional view of the cupped portion of the packaging embodiment of FIG. 12.
Figure 14:
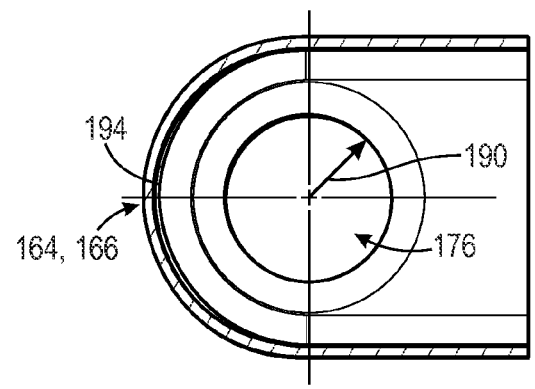
FIG. 14 is a cross-sectional view of the cupped portion of the packaging embodiment of FIG. 12 as viewed from the beneath the cupped portion (inside the packaging)

As illustrated in FIG. 12, FIG. 13 represents a cross-sectional view 13 of the cupped portion 186 that surrounds the opening 176 (e.g., terminal port 176) that allows the post of the terminal 174 to pass through the packaging 162. Further, as set forth above and in further detail below, the cupped portion 186 is designed to support a press fit ring 178 that may be placed around the cupped portion 186 before or after the insertion of the coil assembly 182 into the packaging 160. Additionally, in certain embodiments, the cupped portion 186 may be extruded into the top face 168 packaging 162. FIG. 14 illustrates a bottom-up cross-sectional view 14 (as illustrated in FIG. 12) of the opening 176 (e.g., terminal port 176). As may be appreciated by the combination of FIGS. 13 and 14, and further understood in light of the discussion of FIG. 20 below, the radius 190 and the radius 192 of the cupped portion 186 may generally guide the insulators 184 and the terminal post 174 into the proper position such that the press-fit ring may form a hermetic seal. It may also be appreciated that the rounded ends 164 and 166 of the packaging 162 allow for uniform packaging forming as well as consistent welding during manufacture of the packaging 162 in certain embodiments. It may also be appreciated that the rounded ends 164 and 166, as illustrated in FIG. 14, may further include a shelf or ledge 194 that may help to guide and maintain the insulator 184 and the terminal post 174 in place.

Figure 15:
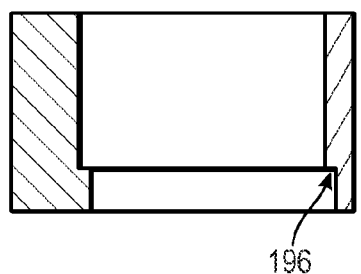
FIG. 15 is a cross-sectional view of the bottom portion of the packaging embodiment of FIG. 12.

As illustrated by the cross-sectional view 15 illustrated in FIG. 12, FIG. 15 illustrates a cross-section of the bottom face 170 of the packaging 162. As illustrated in FIG. 15, in certain embodiments, the packaging 162 may include a shelf 196 that may generally hold the base plate 188 into position at the bottom of the packaging 162 to facilitate the attachment (e.g., welding, crimping, or another suitable method of attachment) of the base plate 188. It may be appreciated that this shelf 196 may therefore enable better alignment of the base plate 188 to the bottom of the packaging 162 and, accordingly, better and easier sealing of the bottom of the battery cell 162.

Figure 16:
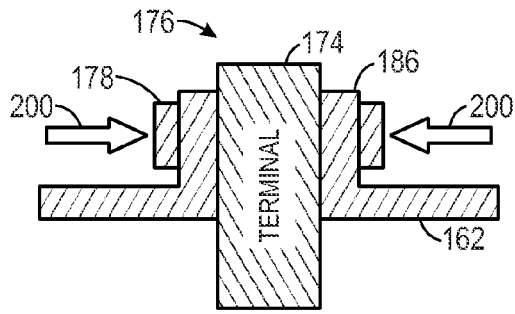
FIG. 16 is a schematic cross-sectional view of a terminal port of a polymer packaging sealed using a press-fit ring, in accordance with an embodiment of the present approach.

To more clearly describe the nature of the press-fit seal of the battery cell 160, FIGS. 16-20 illustrate examples and components that may be utilized in forming the presently disclosed press-fit seal. It should be appreciated that, the press-fit seal is generally robust and may enable effective sealing of both positive and negative terminals, enable increased energy density, and effectively scale with different (e.g., larger or smaller) battery cell size. For example, FIG. 16 illustrates an example of a press-fit sealed terminal 174 for a battery cell (e.g., battery cell 160) having a plastic or polymeric packaging 162. Accordingly, since the terminal 174 need not be electrically isolated from the packaging 162, the terminal 174 may be disposed directly against the packaging 162 within the opening 176 in the packaging 162. Further, disposed around the cupped portion 186 of the opening 176 is a press-fit ring 178 that is configured to provide a compressive force 200 against the cupped portion 186 of the packaging 162 to hermetically seal the opening 176.

Figure 17:
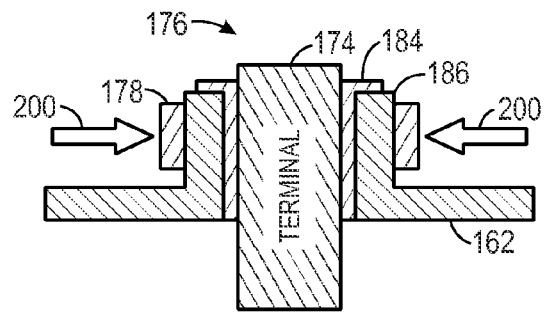
FIG. 17 is a schematic cross-sectional view of a terminal port of a metal packaging sealed using a press-fit ring, in accordance with an embodiment of the present approach.

FIG. 17 illustrates an example of a press-fit sealed terminal for a battery cell 160 having a metallic packaging 162. For such embodiments, as set forth above, the terminal 174 may be electrically isolated from the packaging 162 by the insulator (e.g., insulating gasket 184) that may be disposed over the terminal post 174 prior to insertion into the opening 176 in the packaging 162. Further, a press-fit ring 178 is disposed around the cupped portion 186 surrounding the opening 176 and provides a compressive force 200 against the cupped portion 186 of the packaging 162, as well as the insulating gasket 184, to hermetically seal the opening 176.

Figure 18:
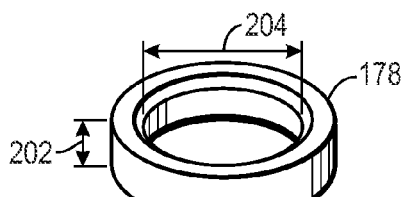
FIG. 18 is a perspective view of an embodiment of a press-fit ring.

FIG. 18 is a perspective view of an embodiment of a press-fit ring 178. In certain embodiments, the press-fit ring 178 may be made from a plastic or polymeric material or a metallic material. In certain embodiments, the press-fit ring 178 may be made of a heat shrink material that may provide compressive force or additional compressive force after heating. In certain embodiments, the press-fit ring 178 may be made from aluminum (e.g., 7075-T6 aluminum or other suitable aluminum), stainless steel, brass, copper, nickel, or tin, depending on the desired physical properties (e.g., coefficient of thermal expansion (CTE), Young's Modulus, etc.). Further, the press that ring may have a width 202 of approximately 1 to 4 mm and a diameter 204 of approximately 5 to 10 mm, in certain embodiments.

Figure 19:
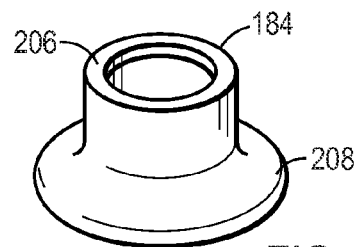
FIG. 19 is a perspective view of an embodiment of an insulating gasket.

FIG. 19 is a perspective view of an embodiment of an insulating gasket 184. In certain embodiments, the insulating gasket 184 may be made of poly(p-phenylene sulfide) (PPS) or another suitable insulating material. It may be appreciated that the shape of the insulating gasket 184 may include a cupped portion 206 that may generally correspond to the shape of the cupped portion 186 of the packaging 162. Additionally, the insulating gasket 184 may further include a collar 208 that may generally exceed the dimensions of the opening 176 such that the insulator may seat within the opening 176 to, in combination with the compressive force provided by the press-fit ring 178, provide a hermetic seal at the opening 176.

Figure 20:
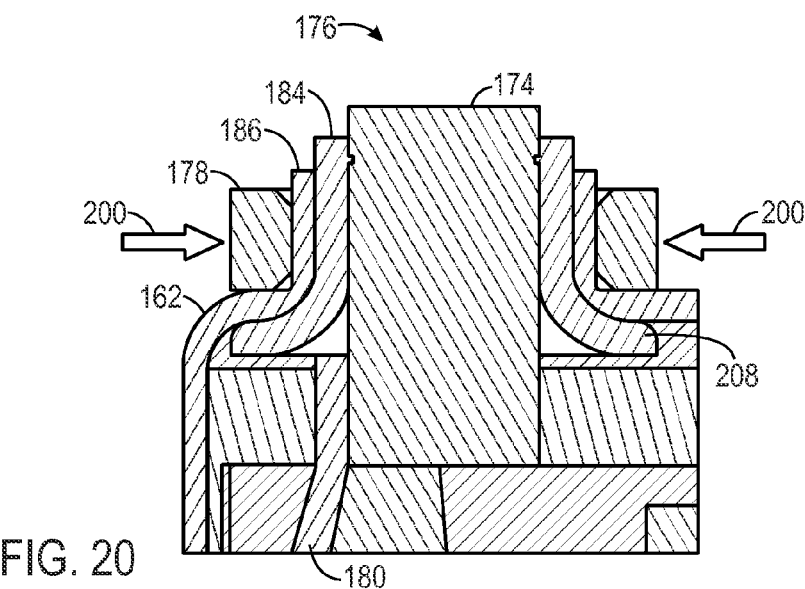
FIG. 20 is a cross-sectional view of a press-fit seal, in accordance with an embodiment of the present approach.

FIG. 20 illustrates a cross-sectional view (similar to FIG. 13) of an embodiment of a terminal 174 that has been press-fit sealed using the press-fit ring 178 illustrated in FIG. 18 and the insulating gasket 184 illustrated in FIG. 19. Since the embodiment illustrated in FIG. 20 includes a metallic packaging 162, the terminal 174 is electrically isolated from the packaging 162 by the insulating gasket 184 that encircles the terminal 174. As illustrated in FIG. 20, the collar 208 of the insulating gasket 184 may generally have a suitable diameter and curvature to seat along the surface 210 of the opening 176 and to provide clearance for portions of the collector 180 coupled to the terminal 174. Further, disposed around the cupped portion 186 of the opening 176 in the packaging 162 is the press-fit ring 178, which provides the compressive force 200 against the cupped portion 186, as well as the insulating gasket 184, to hermetically seal the opening 176 (e.g., terminal port 176). As mentioned above, in certain embodiments, the terminal 174 may be inserted into the opening 176 of the packaging 162 and then press-fit ring 178 may be disposed around the cupped portion 186 and compressed to form a hermetic seal. In other embodiments, the press-fit ring 178 may first be disposed around the cupped portion 186, and subsequently the terminal 174 may be inserted with sufficient force (e.g., pushing the coil assembly 182 upwards and/or pulling the tops of the terminals 174) through the opening 176 such that the press-fit ring 178 forms a hermetic seal via the compressive force 200.

Figure 21:
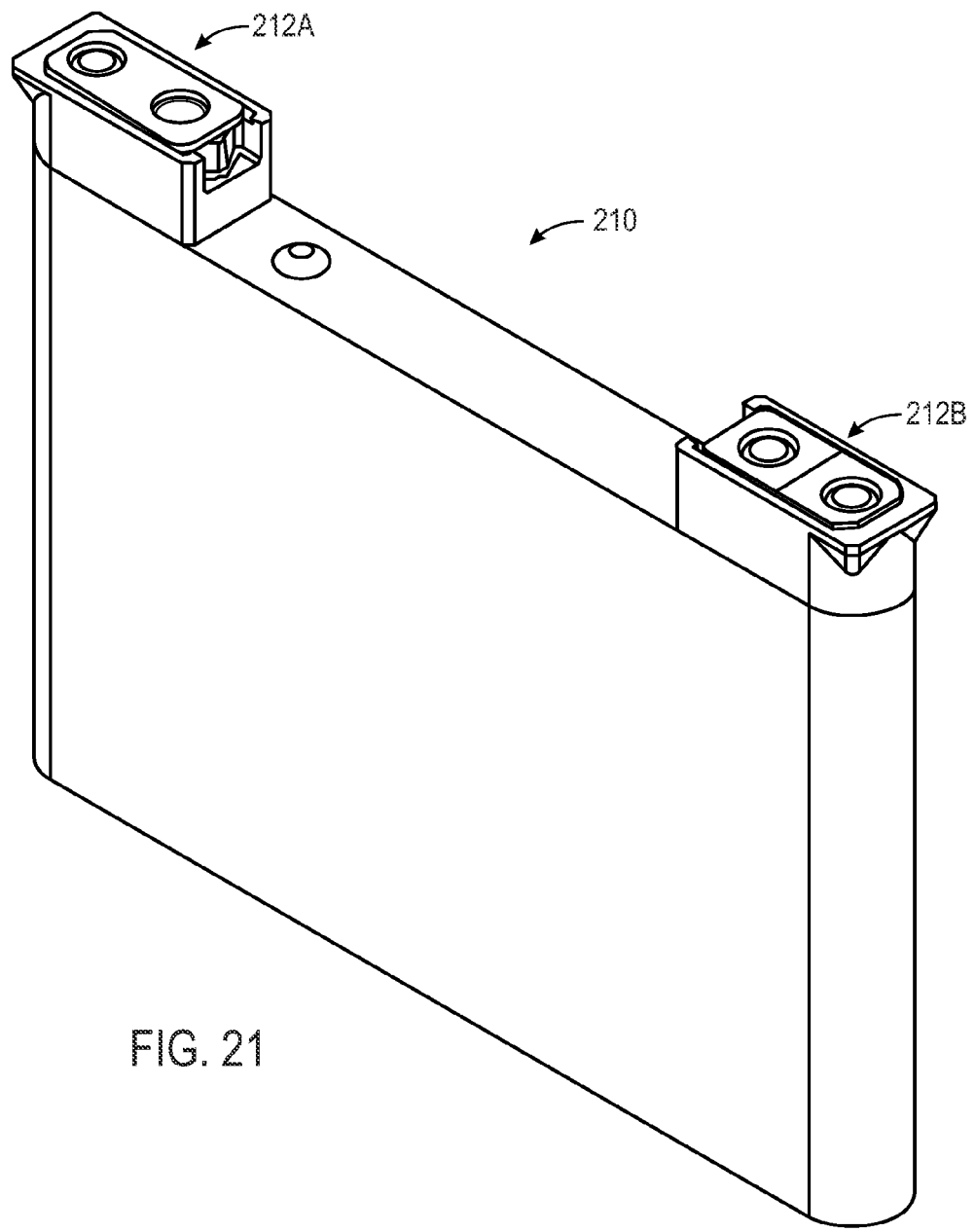
FIG. 21 is a perspective view of an alternative embodiment of the battery cell illustrated in FIG. 10.
Figure 22:
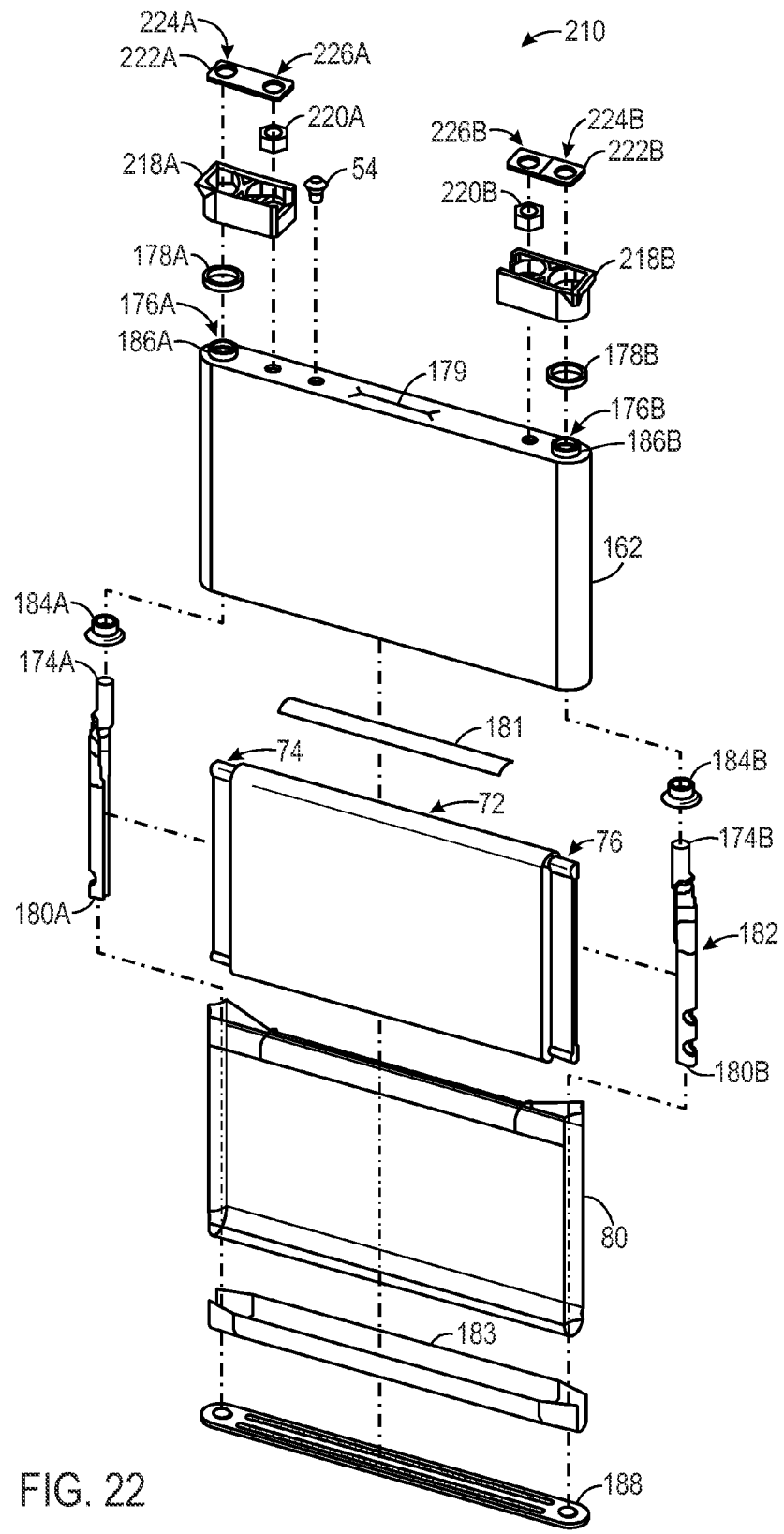
FIG. 22 is an exploded view of the embodiment of the battery cell illustrated in FIG. 21.

FIG. 21 illustrates yet another embodiment of a battery cell 210 having terminals sealed using a compressive force. That is, the battery cell 210 is a modified version of the battery cell 160 that, as set forth below, includes alternative terminal connections 212A and 212B. To better illustrate the internal components and the manufacture of the battery cell 210, FIG. 21 is an exploded view of the embodiment of the battery cell 210. As illustrated in FIG. 22, the battery cell to 10 includes a number of components described above with respect to the battery cell 160 of FIG. 11 (e.g., coil 72, collectors 174, insulating gaskets 184, insulating film 80, layers 181 and 183, and so forth), which may be assembled in a similar manner as described above. It should be appreciated that, while a neutral polarity packaging is illustrated in FIG. 22, and other embodiments, other packaging having other polarity (e.g., positive or negative) may be possible (e.g., using an approach similar to the battery cell embodiment 90 of FIG. 6).

Like the battery cell 160, the embodiment of the battery cell 210 illustrated in FIG. 22 includes a packaging 162 having the cupped portions 186A and 186B respectively disposed over the openings 176A and 176B, which enable the press-fit sealing of the packaging 162. That is, the press-fit rings 178A and 178B respectively seal the openings 176A and 176B in the packaging 162 via a compressive force. Additionally, the battery cell 210 includes a top spacers 218A and 218B that may be polymeric components (e.g., made from nylon, acrylonitrile butadiene styrene (ABS), or another suitable polymer) that may be shaped to respectively surround the terminal posts 174A and 174B, capture and maintain the position of the nuts 220A and 220B, and receive the terminal pads 222A and 222B.

The terminal pads 222 (e.g., 222A and 222B) illustrated in FIG. 22 each include a first portion 224 (e.g., 224A and 224B) having a first opening to receive the respective terminals 174 (e.g., 174A and 174B), which may be subsequently attached to the terminals via laser welding. The illustrated terminal pads 222 (e.g., 222A and 222B) also each include a second portion 226 (e.g., 226A and 226B) having a second opening aligned with the captured nut 220 (e.g., 220A and 220B) below, such that the nut may allow for the connection of threaded terminal connectors. In certain embodiments, the terminal pads 222A and 222B may be made from a single metal (e.g., aluminum, copper, nickel, steel, or another suitable metal or alloy). In other embodiments, the terminal pads 222A and 222B may be bimetallic, each having the first portion 224 made from a first metal (e.g., aluminum, copper, nickel, steel, or another suitable metal or alloy), and each having the second portion 226 made from a different second metal (e.g., aluminum, copper, nickel, steel, or another suitable metal or alloy). It should be appreciated that, accordingly, the terminal pads 222A and 222B enable both polarities of the battery cell 210 to have the same material available (e.g., aluminum) for welding bus bars.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:
1. A system, comprising:
   a battery cell, comprising:
      a packaging having a first terminal port defined by a first cupped portion that extends outwardly from the surface of the packaging;
      a coil disposed within the packaging;
      a first terminal electrically coupled to a portion the coil and protruding through the first terminal port of the packaging; and
      a first press-fit ring that surrounds the first cupped portion and provides a first radially inward compressive force to the first cupped portion that hermetically seals the first terminal in the first terminal port.

2. The system of claim 1, wherein the battery cell comprises an insulating gasket disposed between the first cupped portion and the first terminal in the first terminal port.

3. The system of claim 1, comprising a second terminal electrically coupled to a different portion of the coil, wherein the packaging has a second terminal port defined by a second cupped portion that extends outwardly from the surface of the packaging, wherein the second terminal protrudes through the second terminal port, and comprising a second press-fit ring that surrounds the second cupped portion and provides a second radially inward compressive force to the second cupped portion that hermetically seals the second terminal in the second terminal port.

4. The system of claim 1, wherein the packaging of the battery cell comprises a vent feature stamped into the packaging.

5. The system of claim 1, wherein the packaging is prismatic, cylindrical, or oblong cylindrical in shape.

6. The system of claim 1, wherein the packaging is metallic or polymeric.

7. The system of claim 1, wherein the packaging has a neutral polarity.

8. A battery cell package, comprising:
a first terminal port defined by a first cupped portion extending outwardly from a face of the package, wherein the first terminal port is configured to allow a first terminal to extend through the package, and wherein the first cupped portion is configured to be compressed inwardly toward the first terminal by a first press-fit ring to seal the first terminal in the first terminal port.

9. The battery cell package of claim 8, comprising a second terminal port defined by a second cupped portion extending outwardly from the face of the package, wherein the second cupped portion is configured to allow a second terminal to extend through the package, and wherein the second cupped portion is configured to be compressed inwardly toward the second terminal by a second press-fit ring to seal the second terminal in the second terminal port.

10. The battery cell package of claim 9, wherein the first terminal port is configured to receive a first insulator gasket, and wherein the first insulator gasket is configured to be disposed between the first terminal and the first cupped portion, and wherein the second terminal port is configured to receive a second insulator gasket, and wherein the second insulator gasket is configured to be disposed between the second terminal and the second cupped portion.

11. A method of manufacturing a battery cell, comprising:
providing a battery package having a terminal port defined by a cupped portion extending outwardly from the battery package;
disposing a coil assembly in the battery package, wherein the coil assembly comprises a coil coupled to a terminal; and
disposing a press-fit ring around the cupped portion to inwardly compress the cupped portion and then passing the terminal through the terminal port with sufficient pushing and/or pulling force to hermetically seal the terminal in the terminal port.

12. A method of manufacturing a battery cell, comprising:
providing a battery package having a terminal port defined by a cupped portion extending outwardly from the battery packaging;
disposing a coil assembly in the battery packaging, wherein the coil assembly comprises a coil coupled to a terminal; and
passing the terminal through the terminal port and then disposing a press-fit ring around the cupped portion to compress the cupped portion inwardly toward the terminal to hermetically seal the terminal in the terminal port.

13. The system of claim 1, wherein a portion of the first terminal that is hermetically sealed in the first terminal port is substantially smooth.

14. The system of claim 1, wherein the first press-fit ring is metallic.

15. The system of claim 1, wherein the packaging is polymeric.

16. The system of claim 1, wherein the packaging has a positive or negative polarity.

17. The system of claim 3, wherein a portion of the second terminal that is hermetically sealed in the second terminal port is substantially smooth.

18. The system of claim 3, wherein the battery cell comprises an insulating gasket disposed between the second cupped portion and the second terminal in the second terminal port.

19. The system of claim 3, wherein the second press-fit ring is metallic.

20. The battery cell package of claim 10, wherein the first and second insulator gaskets are shaped like the first and second cupped portions, respectively.

21. The method of claim 11, comprising disposing an insulating gasket in the cupped portion before passing the terminal through the terminal port.

22. The method of claim 12, comprising disposing an insulating gasket in the cupped portion before passing the terminal through the terminal port.

* * * * *

UNITED STATES PATENT AND TRADEMARK OFFICE
CERTIFICATE OF CORRECTION

PATENT NO. : 8,945,763 B2  
APPLICATION NO. : 13/746054  
DATED : February 3, 2015  
INVENTOR(S) : Matthew R. Tyler and Jason D. Fuhr Page 1 of 1

It is certified that error appears in the above-identified patent and that said Letters Patent is hereby corrected as shown below:

In the Specification

In Column 2, Line 5, delete "DRAWINGS" and insert -- BRIEF DESCRIPTION OF THE DRAWINGS --, therefor.

In Column 5, Line 5, delete "and or" and insert -- and/or --, therefor.

In Column 5, Line 52, delete "packaging 40 and" and insert -- packaging 42 and --, therefor.

In Column 5, Line 53, delete "packaging 40" and insert -- packaging 42 --, therefor.

In Column 5, Line 55, delete "packaging 40" and insert -- packaging 42 --, therefor.

In Column 5, Line 64, delete "packaging 40," and insert -- packaging 42, --, therefor.

In Column 6, Line 6, delete "packaging 40." and insert -- packaging 42. --, therefor.

In Column 6, Line 8, delete "packaging 40" and insert -- packaging 42 --, therefor.

In Column 6, Line 26, delete "44 and 46," and insert -- 44 and nuts 46, --, therefor.

In Column 11, Line 66, delete "packaging 160." and insert -- packaging 162. --, therefor.

In Column 13, Line 52, delete "collectors 174," and insert -- collectors 180, --, therefor.

In the Claims

In Column 15, Lines 22-23, in Claim 6, delete "metallic or polymeric." and insert -- metallic. --, therefor.

Signed and Sealed this  
Seventh Day of July, 2015

Michelle K. Lee  
*Director of the United States Patent and Trademark Office*